(12) United States Patent
Hwang

(10) Patent No.: US 9,377,049 B2
(45) Date of Patent: Jun. 28, 2016

(54) LINEAR GUIDEWAY

(71) Applicant: OME TECHNOLOGY CO., LTD., New Taipei (TW)

(72) Inventor: Guann-Pwu Hwang, New Taipei (TW)

(73) Assignee: Ome Technology Co., Ltd., New Taipei (TW)

( * ) Notice: Subject to any disclaimer, the term of this patent is extended or adjusted under 35 U.S.C. 154(b) by 118 days.

(21) Appl. No.: 14/340,673

(22) Filed: Jul. 25, 2014

(65) Prior Publication Data
US 2015/0337898 A1 Nov. 26, 2015

(30) Foreign Application Priority Data
May 23, 2014 (TW) .............................. 103209126 U

(51) Int. Cl.
*F16C 33/10* (2006.01)
*F16C 29/06* (2006.01)
*F16C 33/66* (2006.01)

(52) U.S. Cl.
CPC ......... *F16C 29/0609* (2013.01); *F16C 33/6648* (2013.01); *F16C 29/0642* (2013.01)

(58) Field of Classification Search
CPC ............. F16C 29/0609; F16C 29/0642; F16C 33/6648

USPC ......................................... 384/13, 15, 43–45
See application file for complete search history.

(56) References Cited

U.S. PATENT DOCUMENTS

| 7,717,621 B2* | 5/2010 | Kakei ................. | F16C 29/0635 384/13 |
| 7,740,406 B2* | 6/2010 | Kakei ................. | F16C 29/0635 384/13 |
| 8,403,562 B2* | 3/2013 | Geka ..................... | F16C 29/065 384/13 |

\* cited by examiner

*Primary Examiner* — James Pilkington
(74) *Attorney, Agent, or Firm* — Rosenberg, Klein & Lee

(57) ABSTRACT

A linear guideway includes an end cap and a resilient sheet. The end cap includes a main plate, a surrounding plate, and two side positioning pillars. The surrounding plate and the side positioning pillars are perpendicularly extended from the main plate. The inner edge of the main plate has two protruding segments facing with each other. The side positioning pillars are respectively arranged adjacent to the first protruding segments. The resilient sheet has two first side positioning holes respectively sleeving the two first side positioning pillars, and the resilient sheet is disposed on the main plate. Thus, by the cooperation of the first side positioning pillar and the first side positioning hole, the resilient sheet is firmly received in the end cap and the first side positioning pillars support the inner edge of the resilient sheet.

5 Claims, 8 Drawing Sheets

LINEAR GUIDEWAY

BACKGROUND OF THE DISCLOSURE

1. Field of the Disclosure

The instant disclosure relates to a guideway; in particular, to a linear guideway.

2. Description of Related Art

The conventional linear guideway includes an elongated track, at least one sliding block which sleeves the track, a plurality of rollers arranged between the track and the sliding block, a circulation module for cycling the rollers, and two end cap modules respectively mounted on two opposite ends of the sliding block. Each end cap module includes an end cap, a plurality of metallic sheets received in the end cap, and a plurality of oil-absorbing sheets received in the end cap. The metallic sheets and the oil-absorbing sheets in each end cap module are alternatively stacked.

Thus, when the oil-absorbing sheets abut against the track, the end cap does not provide a force to support the oil-absorbing sheets. The positioning effect between the oil-absorbing sheets and the end cap of the conventional end cap module can be improved.

SUMMARY OF THE DISCLOSURE

One embodiment of the instant disclosure provides a linear guideway to effectively solve the problem generated from the conventional end cap module.

The linear guideway comprises: an elongated track having two roller grooves respectively formed on two opposite sides thereof; a sliding block module which slidably sleeves the track; and two end cap modules respectively installed on two opposite ends of the sliding block module and slidably sleeving the track. Each end cap module comprises: an end cap, comprising: an U-shaped main plate including a substantially U-shaped outer edge, a substantially U-shaped inner edge corresponding to the outer edge, and two end edges connecting the outer edge and the inner edge, wherein the outer edge has an outer bottom edge and two outer side edges respectively connected to two opposite ends of the outer bottom edge, the inner edge has an inner bottom edge and two inner side edges respectively connected to two opposite ends of the inner bottom edge, each inner side edge has a first protruding segment arranged away from the inner bottom edge, the first protruding segments are respectively arranged in the roller grooves, and each first protruding segment and the corresponding rolled groove define a gap therebetween; a surrounding plate integrally extended form the outer edge and the end edges of the main plate along an extending direction substantially perpendicular to the main plate; and two first side positioning pillars respectively and integrally extended from two portions of the main plate, wherein the two portions of the main plate are respectively arranged in two areas defined between the two first protruding segments respectively and the adjacent outer side edges, the first side positioning pillars are arranged outside the roller grooves; and an oil-absorbing unit having at least one U-shaped resilient sheet, two first side positioning holes formed on the resilient sheet, wherein the resilient sheet has an U-shaped outer sheet edge, an U-shaped inner sheet edge corresponding to the outer sheet edge, and two end sheet edges connecting the outer sheet edge and the inner sheet edge, wherein the first side positioning holes of the resilient sheet respectively sleeves the first side positioning pillars of the end cap, the resilient sheet is disposed on the main plate, and the inner sheet edge of the resilient sheet abuts against the roller grooves of the track.

Based on the above, the linear guideway of the instant disclosure improves the positioning effect between the resilient sheet and the end cap by the cooperation of the end cap and the resilient sheet. Moreover, the end cap module of the linear guideway is provided without any metallic sheet, such that the cost of the end cap module is cheaper than that of a conventional end cap module.

DETAILED DESCRIPTION OF THE PREFERRED EMBODIMENTS

Figure 1:
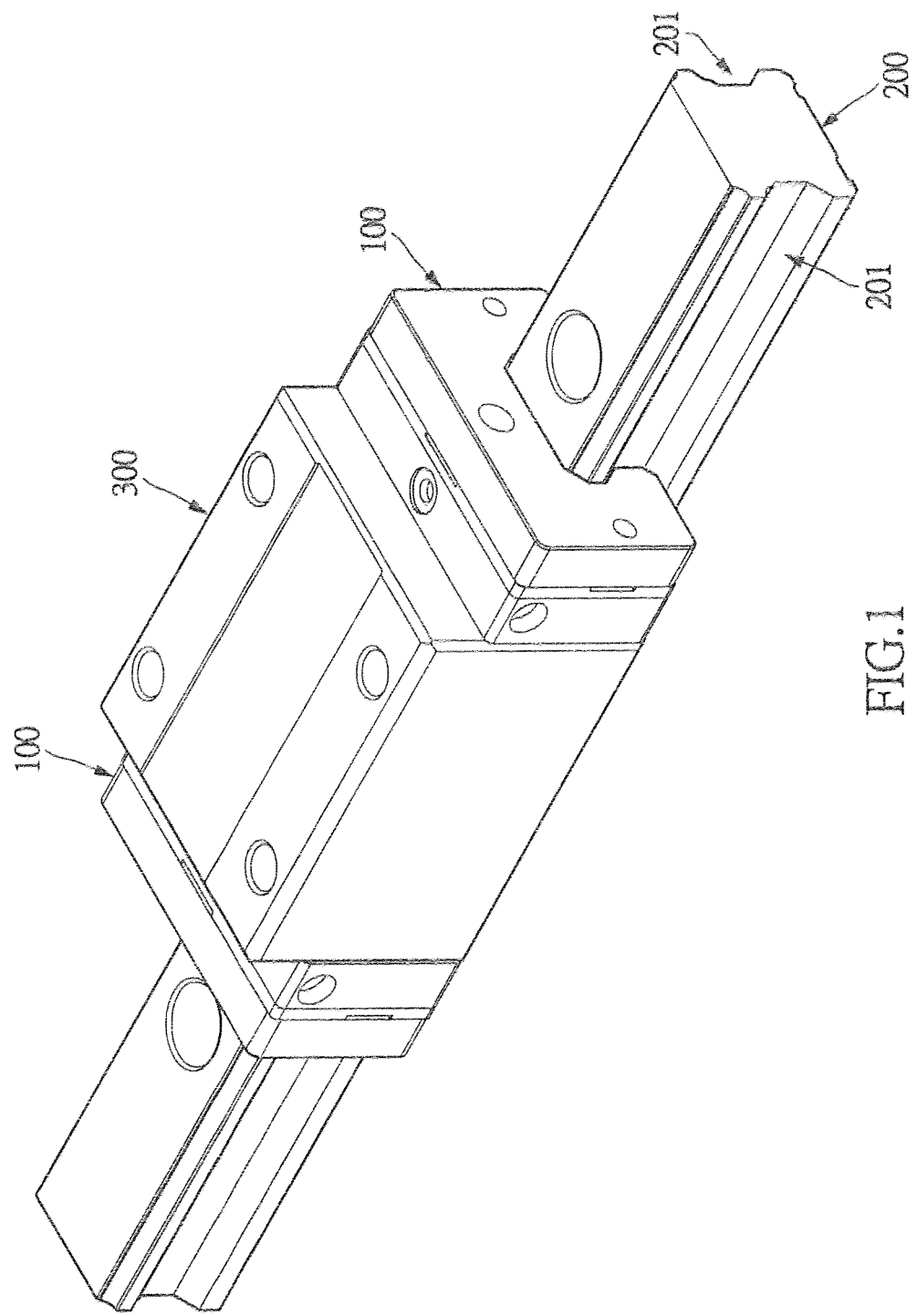
FIG. 1 is a perspective view showing a linear guideway according to the instant disclosure.

Please refer to FIG. 1, which shows a linear guideway including an elongated track 200, a sliding block module 300, and two end cap modules 100. The track 200 has two roller grooves 201 respectively arranged on two opposite sides thereof. The sliding block module 300 slidably sleeves the track 200. The end cap modules 100 are respectively installed on two opposite ends of the sliding block module 300 (i.e., the front end and the rear end of the sliding block module 300 as shown in FIG. 1), such that the end cap modules 100 and the sliding block module 300 slidably sleeve the track 200 together.

The two end cap modules 100 of the instant embodiment have the same construction, so that the following description only discloses one of the end cap modules 100.

Figure 2:
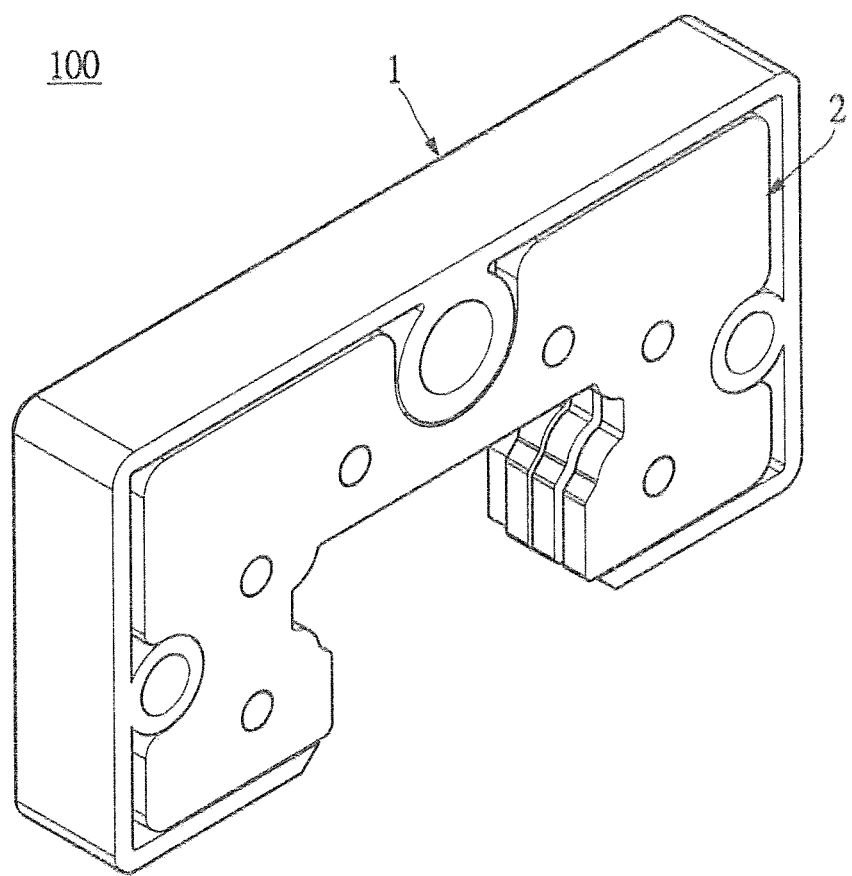
FIG. 2 is a perspective view showing an end cap module of the linear guideway according to the instant disclosure.

Please refer to FIG. 2, which shows the end cap module 100 having an end cap 1 and an oil-absorbing unit 2 received in the end cap 1. Importantly, the end cap 1 of the instant embodiment is only provided for receiving the oil-absorbing unit 2 without any metallic sheet. That is to say, the end cap module having any metallic sheet received in the end cap is different from the end cap module 100 provided by the instant embodiment.

Figure 3:
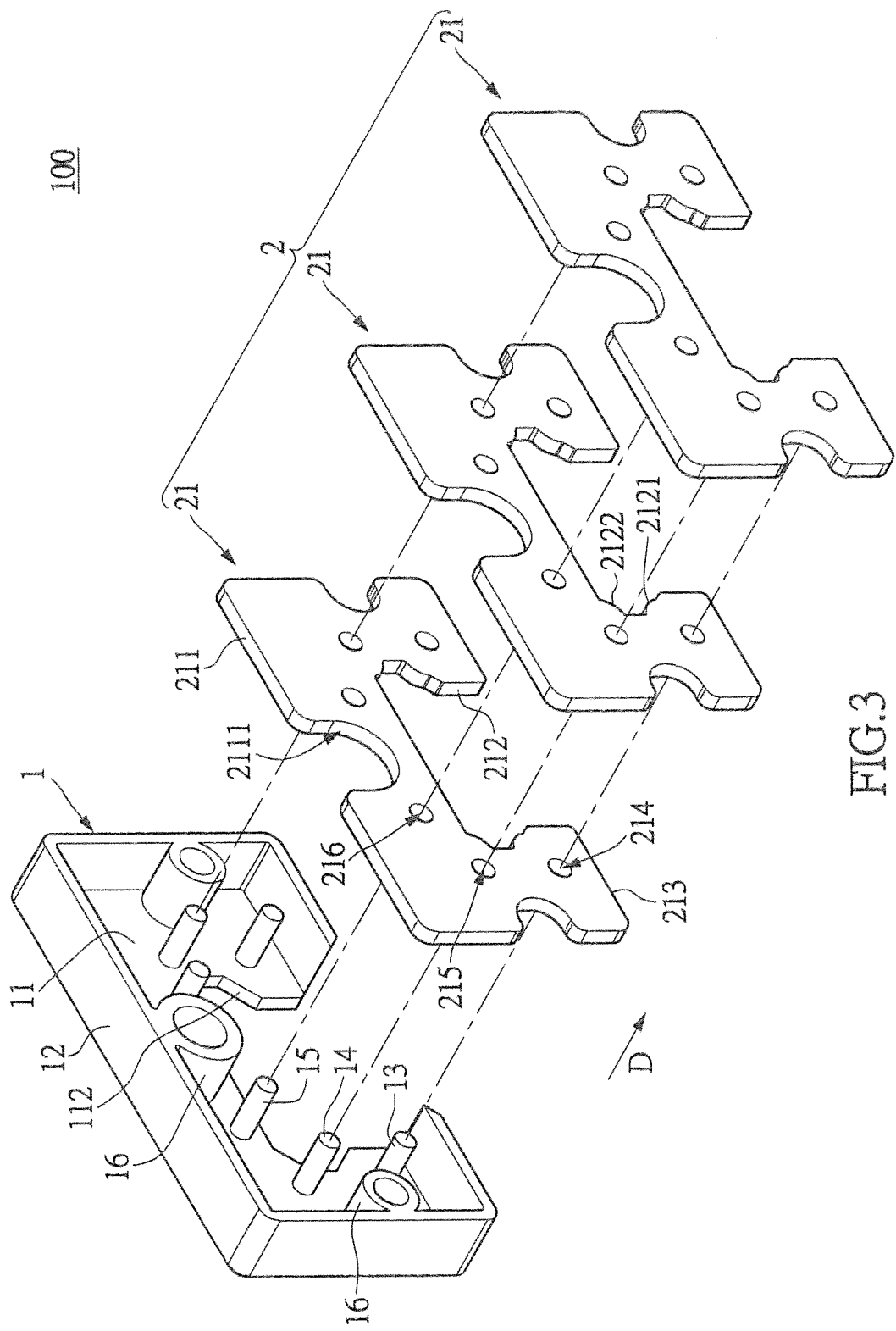
FIG. 3 is an exploded view of FIG. 2.
Figure 4:
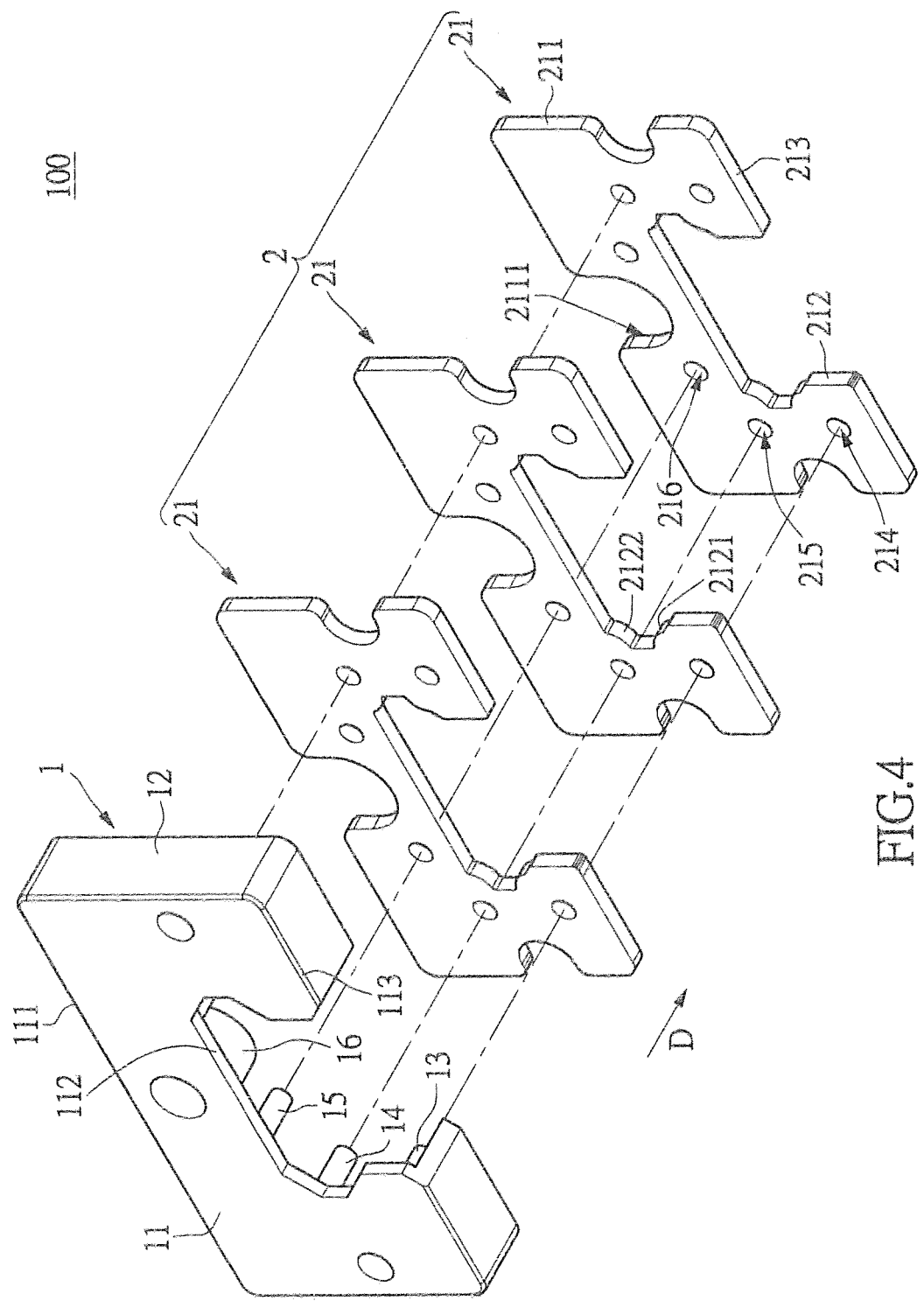
FIG. 4 is an exploded view of FIG. 2 from another perspective.

Please refer to FIGS. 3 and 4. The end cap 1 has a main plate 11, a surrounding plate 12, two first side positioning pillars 13, two second side positioning pillars 14, two bottom positioning pillars 15, and three positioning tubes 16.

The surrounding plate 12, the first side positioning pillars 13, the second side positioning pillars 14, the bottom positioning pillars 15, and the positioning tubes 16 are integrally extended from the main plate 11 along an extending direction D perpendicular to the main plate 11. The first side positioning pillars 13, the second side positioning pillars 14, the bottom positioning pillars 15, and the positioning tubes 16 are arranged in a space defined by the main plate 11 and the surrounding plate 12. That is to say, the height of each one of the first side positioning pillars 13, the second side positioning pillars 14, the bottom positioning pillars 15, and the positioning tubes 16 with respect to the main plate 11 is smaller than or identical to the height of the surrounding plate 12 with respect to the main plate 11.

Figure 5:
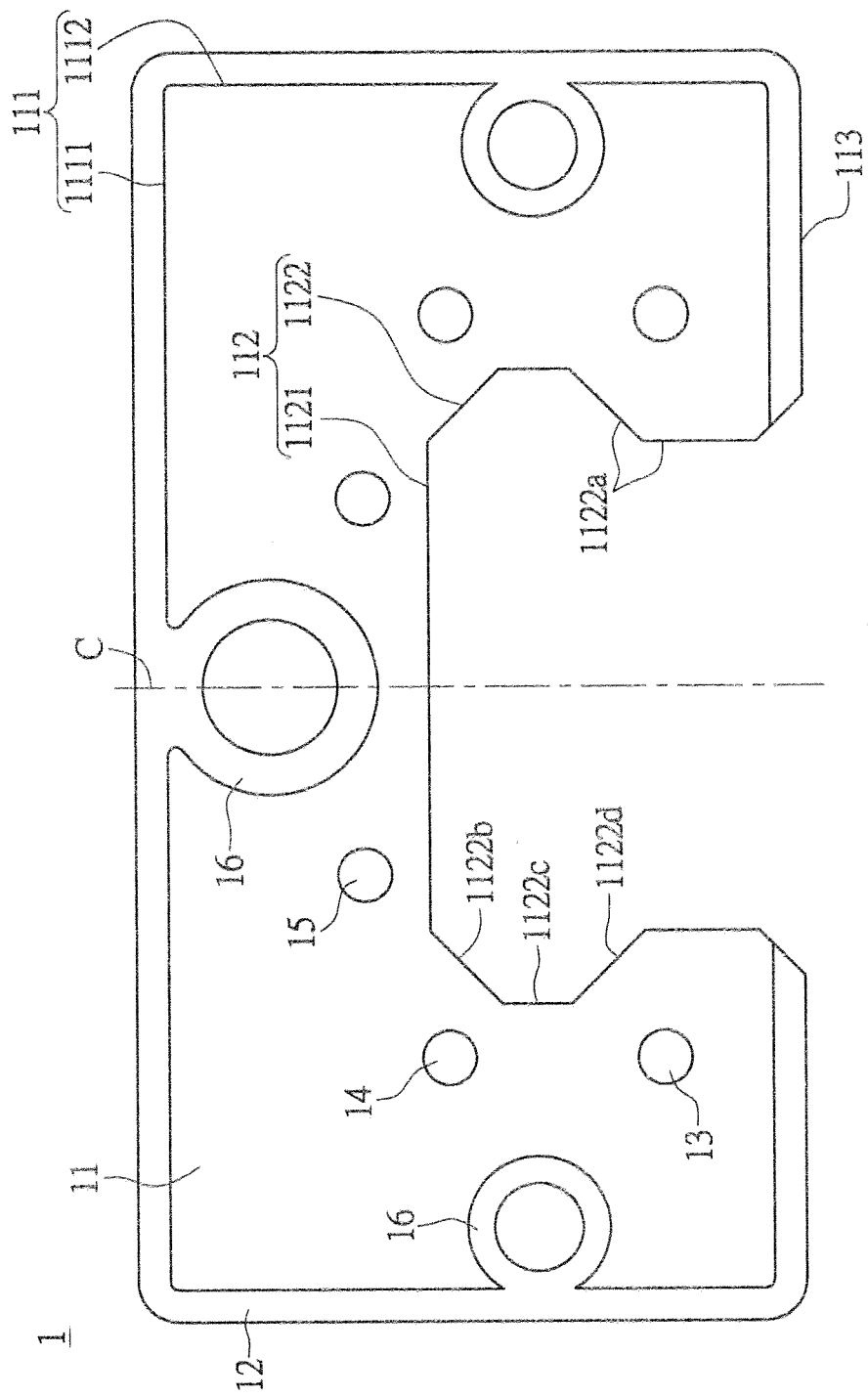
FIG. 5 is perspective view showing an end cap of the end cap module of the linear guideway according to the instant disclosure.

Specifically, as shown in FIG. 5, the main plate 11 has an approximately U-shaped construction. The main plate 11 has a U-shaped inner edge 112, U-shaped outer edge 111 corresponding to the inner edge, and two end edges 113 connecting the inner edge 112 and the outer edge 111.

The outer edge 111 has an outer bottom edge 1111 and two outer side edges 1112 respectively connected to two opposite ends of the outer bottom edge 1111. The inner edge 112 has an inner bottom edge 1121 and two inner side edges 1122 respectively connected to two opposite ends of the inner bottom edge 1121. The end cap module 100 is substantially symmetrical about the perpendicular bisector C of the inner bottom edge 1121 of the end cap 1, but is not limited thereto.

In more detail, each inner side edge 1122 of the main plate 11 has a first protruding segment 1122a arranged away from the inner bottom edge 1121, and each first protruding segment 1122a has an inclining segment 1122d. Each inner side edge 1122 of the main plate 11 has a second protruding segment 1122b connected to the inner bottom edge 1121. Each inner side edge 1122 of the main plate 11 has a connecting segment 1122c connecting the inclining segment 1122d and the second protruding segment 1122b, and the second protruding segment 1122b and the inclining segment 1122d of each inner edge 1122 are symmetrical to the corresponding connecting segment 1122c.

In other words, when (infinite) lines that include the connecting segments 1122c are defined as standard lines, the first protruding segments 1122a which face each other protrude inwardly from the respective standard lines, and the second protruding segments 1122b protrude inwardly from the respective standard lines.

The surrounding plate 12 is integrally extended from the outer edge 111 and the end edges 113 of the main plate 11 along the extending direction D. Each first side positioning pillar 13 is a cylinder. The two first side positioning pillars 13 are respectively and integrally extended from two portions of the main plate 11 along the extending direction D, wherein the two portions of the main plate 11 are respectively arranged in two areas defined between the two first protruding segments 1122a respectively and the adjacent outer side edges 1112 (i.e., the left-lower area and the right-lower area of the main plate 11 as shown in FIG. 5).

Moreover, each second side positioning pillar 14 is a cylinder. The two second side positioning pillars 14 are respectively and integrally extended from two portions of the main plate 11 along the extending direction D, wherein the two portions of the main plate 11 are respectively arranged in two areas defined between the two second protruding segments 1122b respectively and the adjacent outer side edges 1112 (i.e., the left area and the right area of the main plate 11 as shown in FIG. 5). Each bottom positioning pillar 15 is a cylinder. The two bottom positioning pillars 15 are respectively and integrally extended from two portions of the main plate 11 along the extending direction D, wherein the two portions of the main plate 11 are arranged in an area defined between the inner bottom edge 1121 and the adjacent outer bottom edge 1111 (i.e., the upper area of the main plate 11 as shown in FIG. 5).

The extending direction D in the instant embodiment is substantially perpendicular to the main plate 11. A virtual connecting line passing through the centers of one of the first side positioning pillars 13 and the adjacent second side positioning pillar 14 is approximately parallel to the perpendicular bisector C. Moreover, some position conditions of the first and second side positioning pillars 13, 14 with respect to the main plate 11 can improve the effect of the end cap module 100, and the position conditions are disclosed when introducing the oil-absorbing unit 2.

Each positioning tube 16 is a circular tube integrally connected to the main plate 11 and the surrounding plate 12. The end cap 1 has three penetrating portions respectively communicated with the hollow portions of the positioning tubes 16.

Specifically, two of the positioning tubes 16 (i.e., the two positioning tubes 16 arranged at left side and right side as shown in FIG. 5) are respectively and integrally extended from two portions of the main plate 11 along the extending direction D, wherein the two portions of the main plate 11 are respectively adjacent to the outer side edges 1112. The perpendicular bisector of each connecting segment 1122c approximately passes through the central axes of the side positioning tubes 16. The other positioning tube 16 (i.e., the upper positioning tube 16 as shown in FIG. 5) is integrally extended from a portion of the main plate 11 along the extending direction D, wherein the portion of the main plate 11 is adjacent to the center of the outer bottom edges 1111. The perpendicular bisector C of the inner bottom edge 1121 approximately passes through the central axis of the upper positioning tube 16.

Please refer to FIGS. 3 and 4. The oil-absorbing unit 2 includes a plurality of U-shaped resilient sheets 21. The resilient sheets 21 are received in the end cap 1 and are stacked on the main plate 11 of the end cap 1. The height of the stacked resilient sheets 21 with respect to the main plate 11 is smaller than or identical to the height of the surrounding plate 12 with respect to the main plate 11. The oil-absorbing unit 2 in the instant embodiment includes three resilient sheets 21 for example, and the resilient sheets 21 have the same construction, so that the following description only discloses one of the resilient sheets 21.

The resilient sheet 21 is made of non-metal material. That is to say, any metallic sheet is not the resilient sheet 21 provided by the instant embodiment. The resilient sheet 21 is a soft sheet and is capable of absorbing oil. The resilient sheet 21 is preferably made of sponge or foam, but is not limited thereto. The resilient sheet 21 has an U-shaped outer sheet edge 211, an U-shaped inner sheet edge 212 corresponding to the outer sheet edge 211, and two end sheet edges 213 connecting the outer sheet edge 211 and the inner sheet edge 212.

Figure 6:
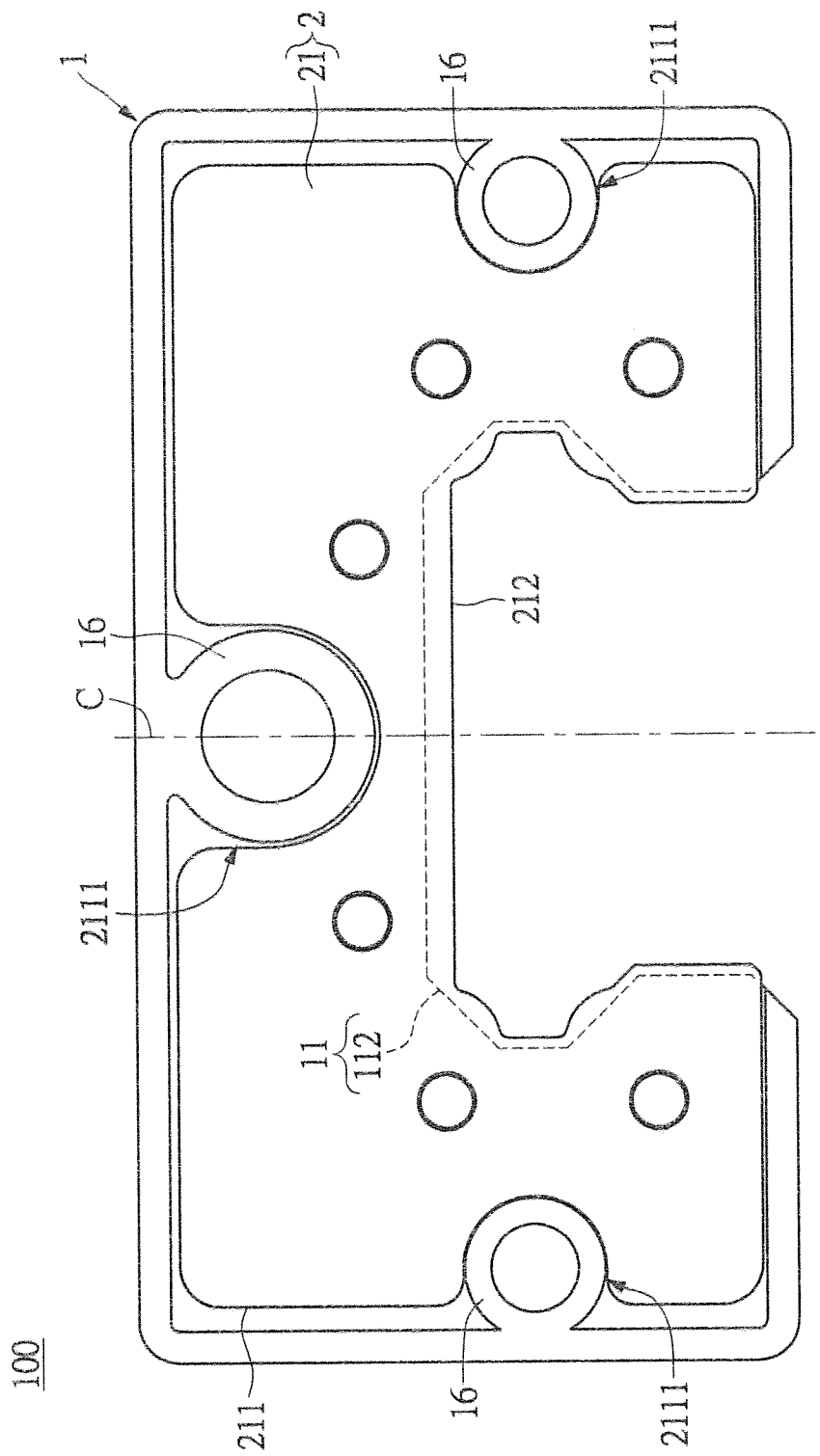
FIG. 6 is a planar view showing the end cap module.
Figure 7:
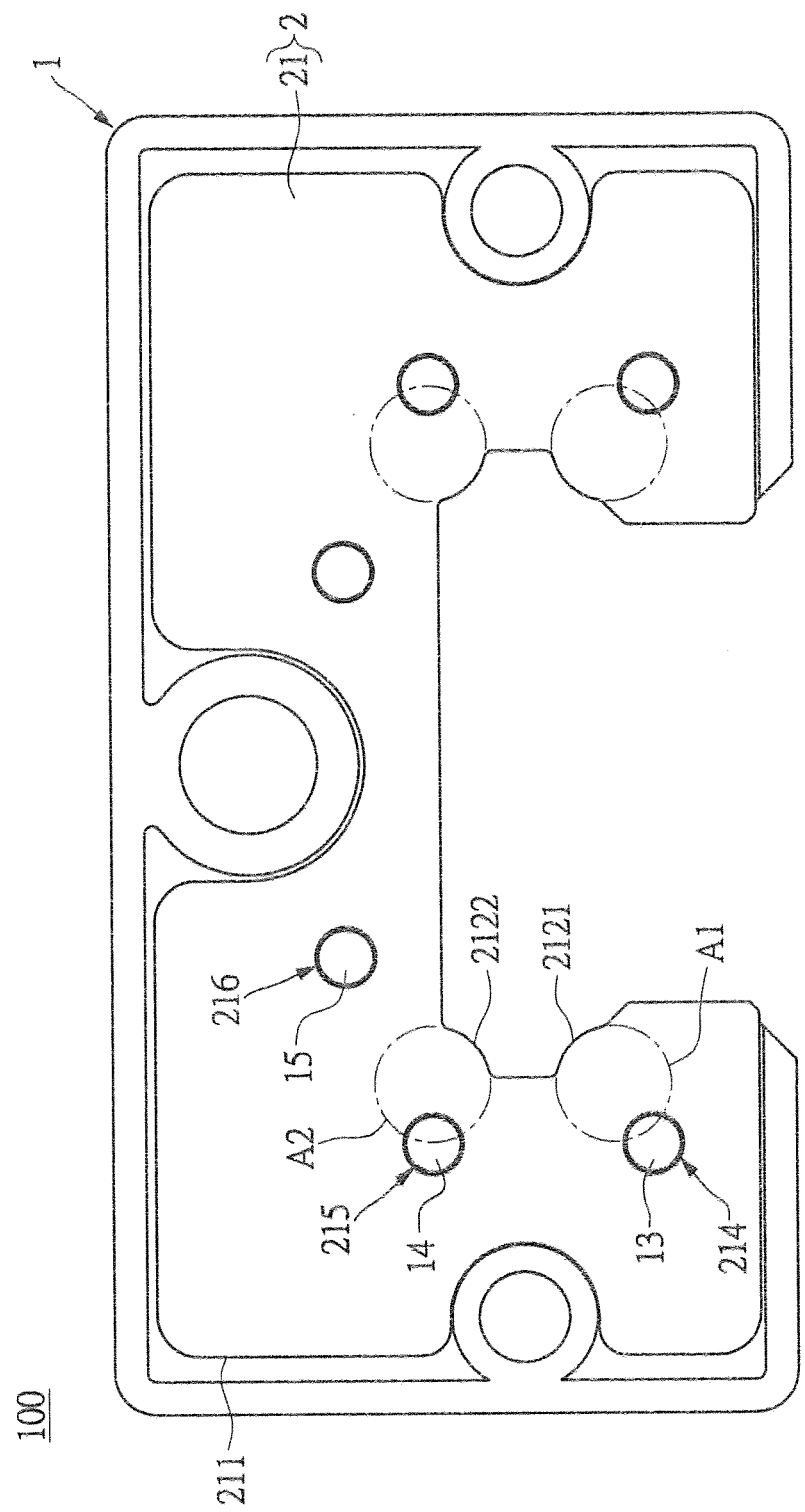
FIG. 7 is a planar view showing the end cap module when defining the first and second areas on the resilient sheets.

Specifically, as shown in FIGS. 6 and 7, the resilient sheet 21 has three notches 2111 formed on the outer sheet edge 211, and the notches 2111 have the same size. The positioning tubes 16 are respectively coupled to the notches 2111. Moreover, the inner sheet edge 212 of the resilient sheet 21 protrudes from the inner edge 112 of the main plate 11 of the end cap 1 (as shown in FIG. 6). That is to say, when the inner edge 112 of the main plate 11 is orthogonally projected onto the resilient sheet 21, the orthogonal projection of the inner edge 112 of the main plate 11 is arranged within the contour of the inner sheet edge 212 of the resilient sheet 21.

The inner sheet edge 212 of the resilient sheet 21 has two first circular segments 2121 and two second circular segments 2122. The two first circular segments 2121 of the resilient sheet 21 are respectively overlapping the two inclining segments 1122d of the first protruding segments 1122a, and the two second circular segments 2122 of the resilient sheet 21 are respectively overlapping the two second protruding segments 1122b.

Define two first circular areas A1 as the areas within the circles which the first circular segments 2121 are arcs of, respectively. The resilient sheet 21 has two penetrating first side positioning holes 214, and the first side positioning holes 214 are respectively and at least partially arranged in the first circular areas A1. The first side positioning pillars 13 are respectively inserted into the first side positioning holes 214.

Define two second circular areas A2 as the areas within the circles which the second circular segments 2122 are arcs of, respectively. The resilient sheet 21 has two penetrating second side positioning holes 215, and the second side positioning holes 215 are respectively and at least partially arranged in the second circular areas A2. The second side positioning pillars 14 are respectively inserted into the second side positioning holes 215.

The resilient sheet 21 has two bottom positioning holes 216 respectively corresponding to the bottom positioning pillars 15 in position and contour, and the bottom positioning pillars 15 are respectively inserted into the bottom positioning holes 216.

The above description has disclosed the construction of the end cap module 100. When the end cap module 100 is installed on the sliding block module 300 and slidably sleeves the track 200, the first protruding segments 1122a are respectively arranged in the roller grooves 201, each first protruding segment 1122a and the corresponding roller groove 201 are provided with a gap arranged therebetween, the first side positioning pillars 13 are arranged outside the roller grooves 201, and the inner sheet edge 212 of each resilient sheet 21 abuts against the roller grooves 201 of the track 200.

Specifically, the inner sheet edge 212 of each resilient sheet 21 is configured to abut against the roller grooves 201 of the track 200, and the end cap module 100 of the instant embodiment is provided without any metallic sheet, so that the resilient sheets 21, particularly the first circular segments 2121 and the second circular segments 2122, need to be supported by the end cap 1. The first side positioning holes 214 and the second side positioning holes 215 are respectively and at least partially arranged in the first cylinder areas A1 and the second cylinder areas A2, thus the first side positioning pillars 13 and the second side positioning pillars 14 are respectively inserted into the first side positioning holes 214 and the second side positioning holes 215 to provide the first circular segments 2121 and the second circular segments 2122 more supporting force and positioning function.

Figure 8:
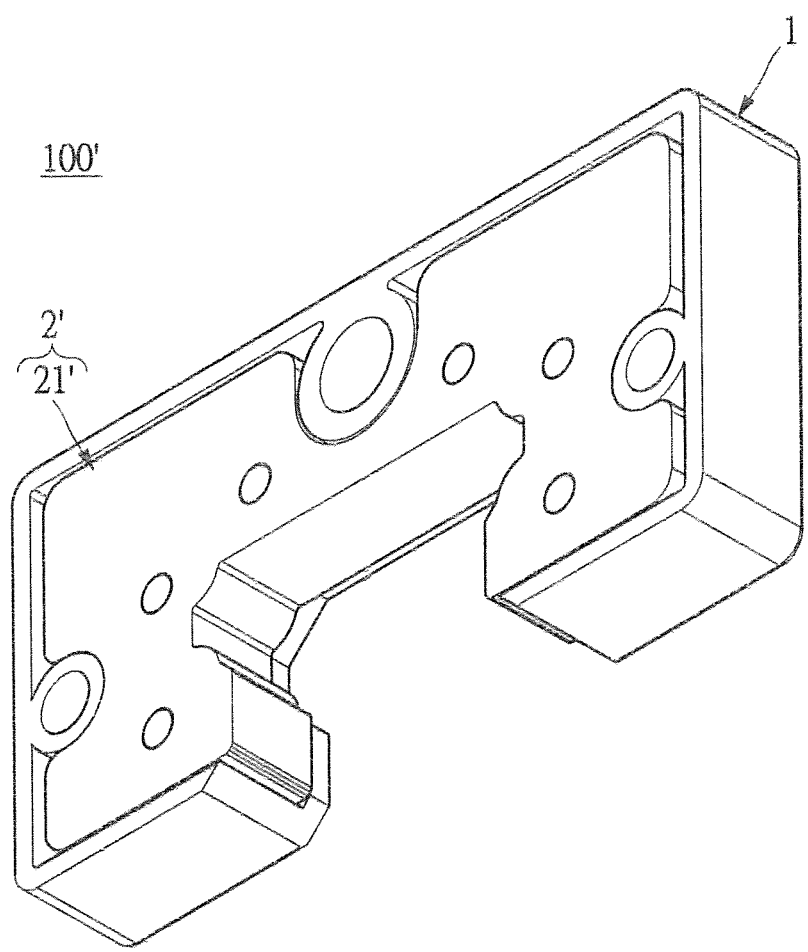
FIG. 8 is a perspective view showing an end cap module according to another embodiment of the instant disclosure.

As an example, the oil-absorbing unit 2 in the above description uses three resilient sheets 21, but is not limited thereto. For example, please refer to FIG. 8, which shows an end cap module 100' having an oil-absorbing unit 2'. The oil-absorbing unit 2' is one resilient sheet 21' disposed on the main plate 11 of the end cap 1, and the height of the resilient sheet 21' with respect to the main plate 11 is substantially identical to the height of the surrounding plate 12 with respect to the main plate 11.

What is claimed is:

1. A linear guideway, comprising:
   an elongated track having two roller grooves respectively formed on two opposite sides thereof;
   a sliding block module slidably sleeving the track; and
   two end cap modules respectively installed on two opposite ends of the sliding block module and slidably sleeving the track, each end cap module comprising:
   an end cap, comprising:
      a U-shaped main plate including a substantially U-shaped outer edge, a substantially U-shaped inner edge corresponding to the outer edge, and two end edges connecting the outer edge and the inner edge,
      wherein the outer edge has an outer bottom edge and two outer side edges respectively connected to two opposite ends of the outer bottom edge,
      wherein the inner edge has an inner bottom edge and two inner side edges respectively connected to two opposite ends of the inner bottom edge,
      wherein each inner side edge has a first protruding segment arranged away from the inner bottom edge, the first protruding segments are respectively arranged in the roller grooves, and each first protruding segment and the corresponding roller groove are provided with a gap arranged therebetween;
      a surrounding plate integrally extended from the outer edge and the end edges of the main plate along an extending direction substantially perpendicular to the main plate; and
      two first side positioning pillars respectively and integrally extended from two portions of the main plate, wherein the two portions of the main plate are respectively arranged in two areas defined between the two first protruding segments respectively and the adjacent outer side edges, the first side positioning pillars are arranged outside the roller grooves; and
   an oil-absorbing unit having at least one U-shaped resilient sheet, two first side positioning holes formed on the resilient sheet, wherein the resilient sheet has a U-shaped outer sheet edge, a U-shaped inner sheet edge corresponding to the outer sheet edge, and two end sheet edges connect the outer sheet edge and the inner sheet edge, wherein the first side positioning holes of the resilient sheet respectively sleeves the first side positioning pillars of the end cap, the resilient sheet is disposed on the main plate, and the inner sheet edge of the resilient sheet abuts against the roller grooves of the track,
      wherein at each end cap module, each inner side edge of the main plate has a second protruding segment, the two second protruding segments are respectively connected to the inner bottom edge, the end cap has two second side protruding pillars, the second side protruding pillars are respectively and integrally extended from two portions of the main plate, wherein the two portions of the main plate are respectively arranged in two areas defined between the two second protruding segments respectively and the adjacent outer side edges, the resilient sheet has two second side positioning holes respectively sleeving the two second side protruding pillars of the end cap,
      wherein at each end cap module, each first protruding segment has an inclining segment, each inner side edge of the main plate has a connecting segment connecting the inclining segment and the second protruding segment thereof, and the second protruding segment and the inclining segment of each inner side edge are symmetrical to the corresponding connecting segment,
      wherein at each end cap module, the inner sheet edge of the resilient sheet has two first circular segments, and the two first circular segments of the resilient sheet are respectively overlapping the two inclining segments, wherein each of the first circular segments has a radius of curvature defining a first circular area, and the first circular areas respectively include the first circular segments, the two first side positioning holes are respectively and at least partially arranged in the first circular areas.

2. The linear guideway as claimed in claim 1, wherein at each end cap module, the inner sheet edge of the resilient sheet has two second circular segments, and the two second circular segments of the resilient sheet are respectively overlapping the two second protruding segments, wherein each of the second circular segments has a radius of curvature defining a second circular area, and the second circular areas respectively include the second circular segments, the two second side positioning holes are respectively and at least partially arranged in the second circular areas.

3. The linear guideway as claimed in claim 1, wherein at each end cap module, the end cap has at least one bottom positioning pillar, the bottom positioning pillar is integrally extended from a portion of the main plate, wherein the portion of the main plate is arranged in an area defined between the inner bottom edge and the adjacent outer bottom edge, the resilient sheet has at least one bottom positioning hole sleeving the bottom positioning pillar of the end cap.

4. The linear guideway as claimed in claim 1, wherein the end cap module is symmetrical about the perpendicular bisector of the inner bottom edge of the end cap.

5. The linear guideway as claimed in claim 1, wherein at each end cap module there are at least two resilient sheets, the resilient sheets having the same construction and are stacked on the main plate of the end cap, the height of the stacked resilient sheets with respect to the main plate is smaller than or identical to the height of the surrounding plate with respect to the main plate.

\* \* \* \* \*